March 11, 1969 S. P. STAMATIS 3,432,615

KEYED AGC CIRCUIT UTILIZING COMPOSITE VIDEO SIGNAL SUPPLIED FROM DETECTOR

Filed Oct. 15, 1965

INVENTOR
Sam P. Stamatis

BY Anderson, Luedeka, Fitch, Even & Tabin
ATTORNEYS

United States Patent Office 3,432,615
Patented Mar. 11, 1969

3,432,615
KEYED AGC CIRCUIT UTILIZING COMPOSITE VIDEO SIGNAL SUPPLIED FROM DETECTOR

Sam P. Stamatis, Chicago, Ill., assignor to Wells-Gardner Electronics Corporation, Chicago, Ill., a corporation of Illinois Filed Oct. 15, 1965, Ser. No. 496,407
U.S. Cl. 178—7.3 13 Claims
Int. Cl. H04n 3/16, 5/38; H04b 1/16

ABSTRACT OF THE DISCLOSURE

A gain control circuit for controlling the gain of a television receiver is developed from the video detector output independent of the video amplifier by direct connection to the resistor load of the detector circuit. A small portion to the resistor load of the detector output signal is applied as the input control signal to the emitter-base circuit of a transistor of the N-P-N type which is forward biased so as to be always conducting when voltage is applied to the collector of the transistor. Pulses derived from the horizontal sweep circuit are applied to the collector to produce pulses of collector current at the times the horizontal synchronizing pulses appear in the detected video signal. The magnitude of the collector current pulses is therefore dependent upon the magnitude of the horizontal synchronizing pulses. The collector current pulses are passed through a capacitor and series rectifier. A negative control signal is developed on the capacitor which may then be used to control the gain of the television receiver.

Figure 1:
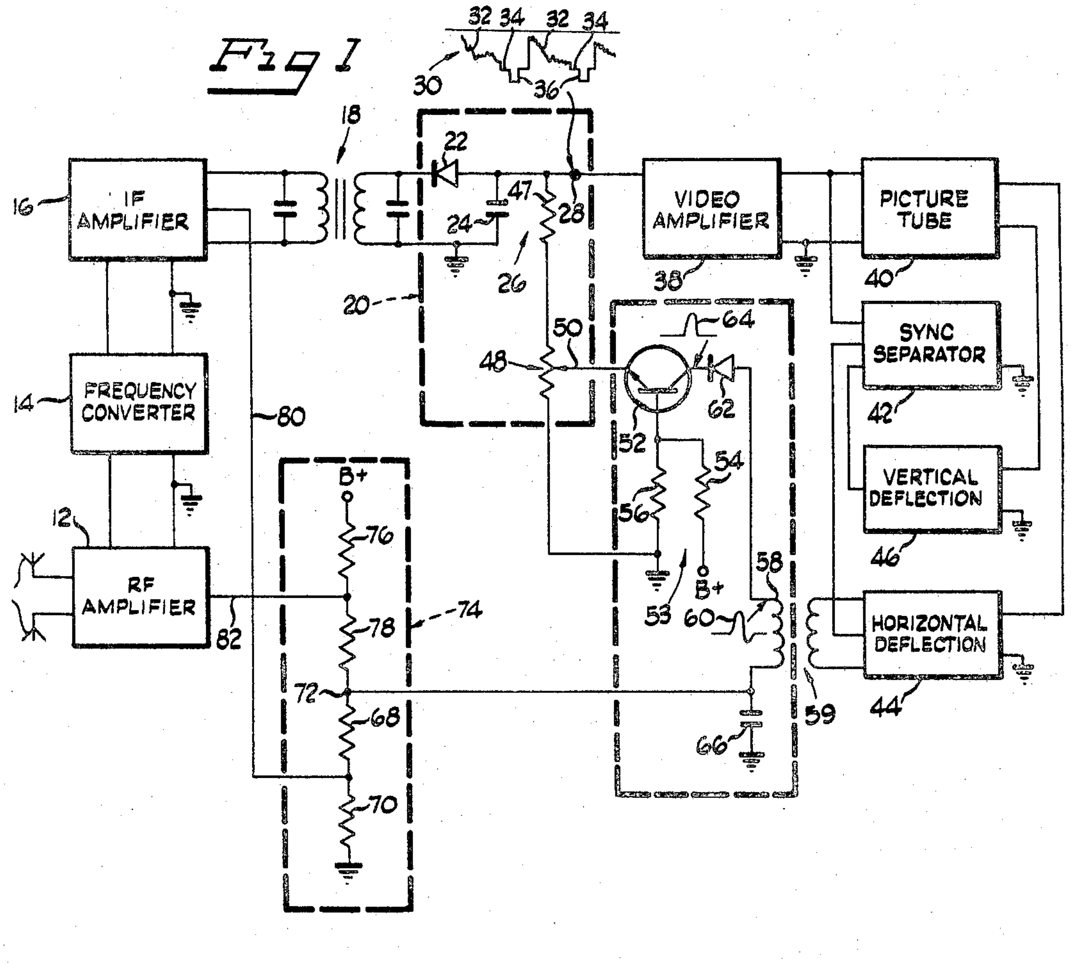

This invention relates to automatic gain control for television receivers and more particularly a keyed automatic gain control circuit utilizing a transistor for developing a gain control signal. Still more particularly the invention relates to an automatic gain control circuit wherein a video signal is applied from a video detector directly to the transistor of an automatic gain control circuit which is keyed by the application of pulses from the horizontal deflection circuit of the television receiver.

In television receivers, it is conventional to derive gain control signals from the received horizontal synchronizing pulse components of the received amplitude modulated composite picture signal. That is, the automatic gain control circuits are utilized to maintain the horizontal synchronizing pulses' components at constant amplitude. The composite picture signal as transmitted includes horizontal synchronizing pulses of constant amplitude with the picture components of appropriate magnitude relative to these horizontal synchronizing pulses. Therefore, if the received signal is amplified to make the horizontal synchronizing components of the proper constant amplitude, the picture components are returned to their appropriate relative magnitude, irrespective of any variations in attenuation during the transmission.

In television reception, it is conventional to pass the received amplitude modulated signals through a radio frequency amplifier, then through a frequency converter, and then through an intermediate frequency amplifier. The received signal is then conventionally applied to a detector which detects the amplitude modulated signal and produces a composite picture signal which is then conventionally amplified by a video amplifier and applied to a picture tube. The synchronizing components as developed at the output of the video amplifier are utilized to control the horizontal and vertical sweep circuits of the picture tube. It is known to utilize the output of the video amplifier to develop gain control signals which are then applied to the radio frequency amplifier or the intermediate frequency amplifier or both, in order to maintain a constant signal level at the output of the video amplifier. In particular, it is known to use the horizontal synchronizing pulse portions of the composite picture signal at the output of video amplifier to derive the automatic gain control signals. Further, it is known to isolate the horizontal synchronizing portions for use in the automatic gain control apparatus by using keying pulses derived from the horizontal sweep circuit.

In accordance with the present invention, the automatic gain control signal is derived directly from the output of the detector and is therefore independent of the video amplifier. No amplification or phase inversion is required. With the circuit of the present invention only a small portion of the detector output signal may be utilized to produce the automatic gain control without loading the detector output appreciably.

In accordance with the present invention, the gain control signal is developed from the detector output by direct connection to the resistor load of the detector circuit. In particular, a small portion of the detector output signal is taken from a voltage divider that comprises the detector load resistance. This signal is applied as the input control signal to the emitter-base circuit of a transistor. The emitter-base junction is forward biased so as to be always conducting when voltage is applied to the collector of the transistor. Electrical pulses are applied to the collector in coincidence with the horizontal synchronizing components and with such polarity and amplitude as to cause pulses of collector current to flow through the transistor during the application of these electrical pulses.

In a preferred embodiment of the invention, pulses derived from the fly-back transformer of the horizontal sweep circuit, are applied through a diode to the collector of the transistor. These pulses are applied in series through a capacitor. The magnitude of the pulses of collector current through the capacitor is determined by the emitter-to-base potential at the time of the fly-back pulse. The fly-back pulse occurs at the time of the horizontal synchronizing component of the composite picture signal appearing at the detector output; hence the magnitude of the collector current pulses through the capacitor depends upon the voltage level of the composite picture signal at the time of these horizontal components. Since the current through the capacitor is thus dependent upon the voltage level at the detector output, the charge and hence the potential developed on the capacitor is also related to the signal level of the composite picture signal during the horizontal synchronizing pulses. The potential developed on the capacitor is used as an automatic gain control signal and applied to the radio frequency amplifier or the intermediate frequency amplifier or both to provide such amplification as produces a composite picture signal of constant amplitude, as is required for a stable resultant picture on the picture tube. In accordance with the present invention, a transistor of the N-P-N type is used to produce a negative control signal suitable for direct application to radio frequency and intermediate frequency amplifiers of the tube type.

Figure 2:
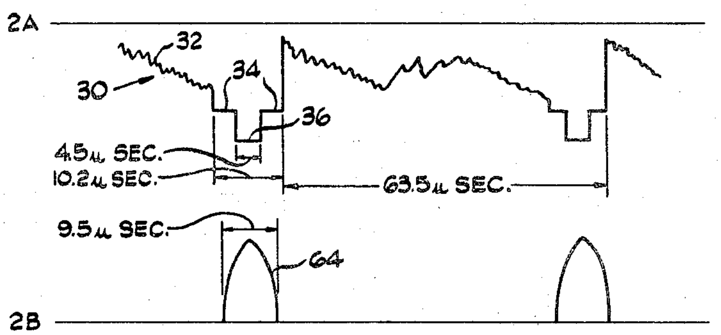

Therefore, a primary object of the present invention is to produce an automatic gain control signal for television receivers directly from the detector output signal. It is a further object of the present invention to develop such gain control signal while utilizing only a small portion of the detector output and without appreciably loading the detector. It is still a further object of the present invention to produce gain control signals by applying a portion of the detector output signal to a transistor, the operation of which is keyed to the horizontal sweep circuit of the television receiver. Other objects and advantages of the present invention will become apparent from consideration of the following description particularly when considered in the light of the appended drawings, in which:

FIGURE 1 is a diagrammatic illustration of a television receiver including a preferred embodiment of the automatic gain control of the present invention; and FIGURE 2 is an illustration of wave forms at respective points in the gain control circuit as shown in FIGURE 1.

The drawings show a conventional television receiver modified to include the automatic gain control of the present invention. In such receivers the transmitted amplitude modulated television signal is received by an antenna 10 and applied to a radio frequency amplifier 12 which selects the appropriate channel and amplifies the selected signal. The amplified signal is then applied to a frequency converter 14 where it is converted into an intermediate frequency signal. The intermediate frequency signal is amplified further by an intermediate frequency amplifier 16. The amplified output of the intermediate frequency amplifier 16 is applied through a coupling network 18 to a detector 20, which operates in a conventional manner to demodulate the amplitude modulated signal from the intermediate frequency amplifier to produce a composite picture signal. The demodulated composite picture signal includes picture information portions and the horizontal and vertical synchronizing components. This demodulated signal is directly related to the composite picture signal as used to modulate the carrier frequency at the television transmitter. It is this composite picture signal at the detector that it is desired to maintain of uniform amplitude with the automatic gain control circuit of the present invention.

The AM detector 20 conventionally includes a diode 22, a capacitor 24 and a load resistor 26. With the diode 22 poled as indicated, the detector output appearing on a conductor 28 connected to the load resistor 26 is a negative signal having a wave form as illustrated by wave form 30. Wave form 30 illustrates a composite picture signal including picture portions 32, horizontal blanking portions or pedestals 34 and horizontal synchronizing pulses 36. This signal on conductor 28 also includes the components of the vertical interval (not shown). The composite picture signal from the detector 20 is applied to a video amplifier 38 where it is further amplified and applied to a picture tube 40 which reproduces the transmitted picture in a conventional manner.

The picture tube also receives other signals derived from the output of the video amplifier to provide proper synchronization for the picture. To this end, the output of the video amplifier 38 is applied to a sync separator 42 which separates the horizontal and vertical synchronizing pulses from the amplified composite picture signal and applies them respectively to horizontal and vertical deflection circuits 44 and 46. The horizontal and vertical deflection circuits operate in a conventional manner to produce signals for driving the horizontal and vertical deflection elements of the picture tube to cause the electron beam in the picture tube to sweep the picture tube. The synchronizing pulses control the deflection circuits so that the outputs of these horizontal and vertical deflection circuits 44, 46 are applied to the deflection elements in such manner as to synchronize the sweep of the electron beam in the picture tube with the synchronizing pulses in the received signals in order that the resultant picture accurately reproduce the original transmitted picture information.

In accordance with the present invention, the output resistor 26 of the detector 20 comprises a fixed resistor 47 in series with a potentiometer 48 having a movable tap 50. Thus a portion of the composite picture signal as developed on conductor 28 appears at the tap 50 of the potentiometer 48. As illustrated in the drawing, this negative signal on tap 50 is applied as a control signal to the emitter of a transistor 52 of the N-P-N type. In order not to load the detector output appreciably, the resistance of the resistor 47 is made large relative to the effective resistance between the tap 50 and ground. In the circuit illustrated, it is preferable that the relative resistances provide a control signal at the tap 50 that is of the order of no more than about one-tenth of the detected composite picture signal as appears on the conductor 28.

A positive voltage is applied to the base of transistor 52 by use of a voltage divider 53 comprising resistors 54 and 56 connected between a source of positive potential and ground. The bias thus applied maintains the base-to-emitter junction of the transistor 52 forward biased and thus places the transistor 52 in a conductive state; that is, under such condition of bias, the transistor 52 conducts collector current whenever a positive signal of sufficient amplitude is applied to the collector. The magnitude of the collector current is determined by the potential established at the tap 50 by the composite picture signal of waveform 30.

In the illustrated embodiment of this invention, a signal is applied to the collector of the transistor 52 from a winding 58 on the fly-back transformer 59 which is a conventional part of the horizontal deflection circuit 44. The winding 58 may be, for example, five turns about the core of the fly-back transformer 59. The fly-back transformer 59 functions in the horizontal deflection circuit 44 to produce a fly-back pulse which energizes the horizontal deflection elements of the picture tube to cause the electron beam to retrace following a line of picture information. The fly-back pulses are made to occur during the horizontal blanking intervals, i.e., during the intervals of blanking components 34, in order that the beam be at the left side of the picture tube at the beginning of each picture interval. The horizontal synchronizing components 36 as isolated by the sync separator 42 are used to control the horizontal deflection circuit 44 so that the fly-back pulses occur in synchronism therewith. These fly-back pulses as developed by the fly-back transformer 59 for the horizontal deflection circuit 44 also operate to develop corresponding voltage pulses in the winding 58.

The pulses developed in the winding 58 may take the form illustrated by waveform 60. However, the winding 58 is connected through a diode 62 polarized to pass only positive pulses to the collector of the transistor 52. It thus serves to stop any negative portion of the signal developed by the winding 58 and thus passes to the collector only the positive portion of the signal as shown by waveform 64. Since the emitter-base junction of the transistor 52 is biased to be conducting, the pulse of waveform 64 produces a pulse of collector current through the transistor 52. The magnitude of the collector current depends upon the relative impedance of the transistor 52 as determined by the signal applied to the emitter from the tap 50. Thus the collector current actually flowing through the transistor 52 is directly related to the potential on the tap 50 during the time of occurrence of the pulses of waveform 64.

As stated above, the pulses of waveform 64 as produced by the winding 58 on the fly-back transformer 59 are in synchronization with the horizontal synchronizing pulses 36 of the composite picture signal 30 as developed on the conductor 28 and therefore in synchronization with the horizontal synchronizing pulses as developed at the tap 50. An exemplary relationship between the pulses is illustrated with greater particularly in FIGURE 2.

In FIGURE 2A is illustrated the composite picture signal 30 with its picture portions 32, its horizontal blanking components 34 and its horizontal synchronizing components 36. As noted before, the signal 30 also includes the components of a vertical interval, but those components play no part in the present invention and therefore are not shown in the drawings. The period of each line of the composite picture signal is conventionally 63.5 microseconds, according to American standards. Each horizontal blanking pulse 34 is about 10.2 microseconds long, and each horizontal synchronizing pulse 36 is about 4.5 microseconds long.

In FIGURE 2B is illustrated the signal 64 as derived from the fly-back pulse and applied to the collector of transistor 52 through the diode 62. These pulses occur with the same period as the lines of the composite picture signal 30, namely, 63.5 microseconds. Further, by operation of a conventional synchronizing circuit in the horizontal deflection circuit 44, the pulses 64 occur coincident with the horizontal synchronizing components 36. "Coincident" includes the relationship illustrated where the horizontal synchronizing components 36 occur during respective pulses 64, but where the pulses 64 extend beyond the respective horizontal synchronizing components and cover other portions of the horizontal blanking interval. The duration of each pulse 64 may be 9.5 microseconds.

Since the collector current is directly related to the potential on the tap 50 during the pulses 64, collector current flows in pulses of magnitude dependent upon the magnitude of the horizontal synchronizing components 36 of the composite picture signal 30. There may also be collector current flow beyond the horizontal synchronizing components 36 when the pulses 64 extend to other parts of the horizontal blanking interval as defined by the horizontal blanking components 34. However, the collector current controlled by the horizontal blanking components 34 is small relative to the collector current flow as controlled by the horizontal synchronizing components 36, and furthermore the horizontal blanking components 34 bear a predetermined relationship to the horizontal synchronizing components 36. Therefore action taken to stabilize the magnitude of the horizontal synchronizing components 36 also stabilizes the magnitude of the horizontal blanking components 34, and the total collector current may be used to develop an error or control signal.

The pulses of collector current flow through a capacitor 66 connected in series with the diode 62. One side of the capacitor 66 is connected to a source of reference potential, preferably ground, as shown. The current pulses therefore result in a negative charge on the other side of the capacitor 66. The charge developed on the capacitor 66 is a measure of the collector current passed with each pulse of waveform 64 and hence of the magnitude of the horizontal synchronizing pulses 36. The capacitor 66 is part of an integrating circuit including resistors 68 and 70. This integrating circuit integrates the collector current pulses over a period of time sufficiently long to hold a substantial portion the charge from each pulse on the capacitor for a number of pulses yet sufficiently short to permit the charge to decay fast enough that the circuit may respond to the changes in the signal level with reasonable promptness. The signal derived by such integration is frequently referred to as providing an indication of the average current flow. It is recognized that what is provided is not a true mathematical average of the input pulses, but is rather a weighted average wherein greater weight is given to the more recent pulses. Nevertheless, the derived signal approximates the true mathematical average, for reasonable time constants. With one of the terminals of the capacitor 66 at the reference potential (ground), a negative potential is developed on the other terminal 72 in proportion to the charge on the capacitor 66. The potential on the terminal 72 is therefore directly related to the average magnitude of the horizontal synchronizing pulses 36 and may be used as an automatic gain control signal. The control level may be set by adjustment of the tap 50.

The automatic gain control signal may be applied to a voltage divider 74 which may include the resistors 68 and 70 as well as series resistors 76 and 78 connected as shown between a source of positive voltage and ground in the order of resistor 76, resistor 78, resistor 68 and resistor 70. The negative signal thereupon developed on a conductor 80 connected to the junction between the resistors 68 and 70 may be directly utilized to control the gain of the intermediate frequency amplifier 16 in a manner well-known in the art. At the same time the signal developed on a conductor 82 connected to the junction between resistors 76 and 78 may be utilized to control the gain of the radio frequency amplifier 12 in a manner well-known in the art. The gain control signal as developed on the conductor 82 operates in a delayed manner well-known in the art.

Although a particular preferred embodiment of the present invention has been described in some detail, various modifications may be made therein within the scope of the invention. For example, the gain control circuit as shown specifically in the drawing is particularly suited for television receivers of a particular design. Where the receiver design is itself different, the gain control circuit may be modified accordingly without departing from the scope of the invention. The appended claims are intended to cover such modifications as come within the true scope of the invention.

What is claimed is:

1. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, means for applying electrical pulses to said collector coincident with said horizontal synchronizing components and of such polarity and amplitude as to cause pulses of collector current to flow through said transistor during the application of said electrical pulses, means responsive to said pulses of collector current for derving a signal related to the average collector current through said transistor, and means for utilizing said derived signal to control the gain of said variable gain amplifying means, whereby the amplitude of said composite picture signal is controlled.

2. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said horizontal deflection circuit producing fly-back pulses for causing the retrace of the horizontal deflection, said automatic gain control comprising a transistor having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, means responsive to said fly-back pulses for applying electrical pulses to said collector coincident with said horizontal synchronizing components and of such polarity and amplitude as to cause pulses of collector current to flow through said transistor during the application of said electrical pulses, means responsive to said pulses of collector current for deriving a signal related to the average collector current through said transistor, and means for utilizing said derived signal to control the gain of said variable gain amplifying means, whereby the amplitude of said composite picture signal is controlled.

3. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means, diode means series connected between said capacitance means and said collector, shunt resistance means connected in shunt of said capacitance means, means for applying electrical pulses to said collector coincident with said horizontal synchronizing components and of such polarity and amplitude as to cause pulses of collector current to flow unidirectionally through said transistor, said diode means and said capacitance means during the application of said electrical pulses, said diode means being polarized to pass said pulses of collector current, and means for utilizing the potential thereupon developed on said capacitance means to control the gain of said variable gain amplifying means, whereby the amplitude of said composite picture signal is controlled.

4. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means having first and second terminals, means connecting said first terminal to a reference potential, diode means series connected between said second terminal and said collector, shunt resistance means connected between said first and second terminals, means for applying electrical pulses to said collector coincident with said horizontal synchronizing components and of such polarity and amplitude as to cause pulses of collector current to flow unidirectionally through said transistor, said diode means and said capacitance means during the application of said electrical pulses, said diode means being polarized to pass said pulses of collector current, the time constant of said capacitance means and said shunt resistance means being long relative to the period of said electrical pulses whereby a charge is developed on said second terminal related to the average collector current through said transistor, and means for utilizing the potential thereupon developed on said second terminal to control the gain of said variable gain amplifying means, whereby the amplitude of said composite picture signal is controlled.

5. Automatic gain control for a television receiver including variable gain amplifying means for amplifying the signal received by the television receiver, a detector for demodulating the amplified signal to produce across detector load resistance means a detected composite picture signal having picture signal components, horizontal and vertical blanking components, and horizontal and vertical synchronizing components, said horizontal synchronizing components occurring within the intervals of respective horizontal blanking components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means having first and second terminals, means connecting said first terminal to a reference potential, diode means series connected between said second terminal and said collector, shunt resistance means connected between said first and second terminals, means for applying electrical pulses to said collector coincident with said horizontal synchronzing components within the intervals of respective horizontal blanking components and of such polarity and amplitude as to cause pulses of collector current to flow unidirectionally through said transistor, said diode means and said capacitance means during the application of said electrical pulses, said diode means being polarized to pass said pulses of collector current, the time constant of said capacitance means and said shunt resistance means being long relative to the period of said electrical pulses whereby a charge is developed on said second terminal related to the average collector current through said transistor, and means for utilizing the potential thereupon developed on said second terminal to control the gain of said variable gain amplifying means, whereby the amplitude of said composite picture signal is controlled.

6. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components transistor of the N-P-N type having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means having first and second terminals, means connecting said first terminal to a reference potential, diode means series connected between said second terminal and said collector, shunt resistance means connected between said first and second terminals, means for applying positive electrical pulses to said collector coincident with said horizontal synchronizing components and of such amplitude as to cause pulses of collector current to flow unidirectionally through said transistor, said diode means and said capacitance means during the application of said electrical pulses, said diode means being polarized to pass said pulses of collector current, the time constant of said capacitance means and said shunt resistance means being long relative to the period of said electrical pulses whereby a negative charge is developed on said second terminal related to the average collector current through said transistor, and means for utilizing the negative potential thereupon developed on said second terminal to control the gain of said variable gain amplifying means, whereby the amplitude of said composite picture signal is controlled.

11. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said horizontal deflection circuit including a fly-back transformer for producing fly-back pulses for causing the retrace of the horizontal deflection, said automatic gain control comprising a transistor of the N-P-N type having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means having first and second terminals, means connecting said first terminal to a reference potential, diode means series connected between said second terminal and said collector, shunt resistance means connected between said first and second terminals, a winding on said fly-back transformer for applying positive electrical pulses to said collector coincident with said horizontal synchronizing components and of such amplitude as to cause pulses of collector current to flow unidirectionally through said transistor, said winding, said diode means and said capacitance means during the application of said electrical pulses, said diode means being polarized to pass said pulses of collective current, the time constant of said capacitance means and said shunt resistance means being long relative to the period of said electrical pulses whereby a negative charge is developed on said second terminal related to the average collector current through said transistor, and means for utilizing the negative potential thereupon developed on said second terminal to control the gain of said variable gain amplifying means, whereby the amplitude of said composite picture signal is controlled.

12. Automatic gain control for a television receiver including variable gain amplifying means for amplifying the signal received by the television receiver, a detector for demodulating the amplified signal to produce across a detector load resistor a detected composite picture signal having picture signal components and negative horizontal and vertical synchronizing components, video amplifier means coupled to said detector load resistor for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor of the N-P-N type having an emitter, a base and a collector, and connected as a common-base amplifier, means independent of said video amplifier connected to the detector load resistor at a point intermediate its ends for applying of the order of no more than about one-tenth of the detected composite picture signal to said emitter, means for forward biasing the emitter-base junction of said transistor to maintain said transistor in a conductive state, capacitance means having first and second terminals, means connecting said first terminal to a reference potential, diode means series connected between said second terminal and said collector, shunt resistance means connected between said first and second terminals, means for applying positive electrical pulses to said collector coincident with said horizontal synchronizing components and of such amplitude as to cause pulses of collector current to flow unidirectionally through said transistor, said diode means and said capacitance means during the application of said electrical pulses, said diode means being polarized to pass said pulses of collector current, the time constant of said capacitance means and said shunt resistance means being long relative to the period of said electrical pulses whereby a negative charge is developed on said second terminal related to the average collector current through said transistor, and means for utilizing the negative potential thereupon developed on said second terminal to control the gain of said variable gain amplifying means, whereby the amplitude of said composite picture signal is controlled.

13. Automatic gain control for a television receiver including variable gain amplifying means for amplifying the signal received by the television receiver, a detector for demodulating the amplified signal to produce across detector load resistance means a detected composite picture signal having picture signal components and negative horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor of the N-P-N type having an emitter, a base and a collector, and connected as a common-base amplifier, means independent of said video amplifier connected to the detector load resistance means for applying a relatively small portion of the detected composite picture signal to said emitter, means for applying positive potential to said base to forward bias the emitter-base junction of said transistor to maintain said transistor in a conductive state, capacitance means having first and second terminals, means connecting said first terminal to ground, diode means series connected between said second terminal and said collector, shunt resistance means connected between said first and second terminals, means for applying positive electrical pulses to said collector coincident with said horizontal synchronizing com- and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor of the N-P-N type having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, means for applying positive electrical pulses to said collector coincident with said horizontal synchronizing components and of such amplitude as to cause pulses of collector current to flow through said transistor during the application of said electrical pulses, means responsive to said pulses of collector current for deriving a negative signal related to the average flow of collector current through said transistor, and means for utilizing said derived negative signal to control the gain of said variable gain amplifying means, whereby the amplitude of said composite picture signal is controlled.

7. Automatic gain control for a television receiver including variable gain amplifying means for amplifying the signal received by the television receiver, a detector for demodulating the amplified signal to produce across detector load resistance means a detected composite picture signal having a picture signal components and negative horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor of the N-P-N type having an emitter, a base and a collector and connected as a common-base amplifier, means independent of said video amplifier connected to the detector load resistance means for applying a relatively small portion of the detected composite picture signal to said emitter, means for forward biasing the emitter-base junction of said transsistor to maintain said transistor in a conductive state, means for applying positive electrical pulses to said collector coincident with said horizontal synchronizing components and of such amplitude as to cause pulses of collector current to flow through said transistor during the application of said electrical pulses, means responsive to said pulses of collector current for deriving a negative signal related to the average flow of collector current through said transistor, and means for utilizing said derived negative signal to control the gain of said variable gain amplifying means, whereby the amplitude of said composite picture signal is controlled.

8. Automatic gain control for a television receiver including variable gain amplifying means for amplifying the signal received by the television receiver, a detector for demodulating the amplified signal to produce across detector load resistance means a detected composite picture signal having picture signal components and negative horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said horizontal deflection circuit producing fly-back pulses for causing retrace of the horizontal deflection, said automatic gain control comprising a transistor of the N-P-N type having an emitter, a base and a collector and connected as a common-base amplifier, means independent of said video amplifier connected to the detector load resistance means for applying a relatively small portion of the detected composite picture signal to said emitter, means for forward biasing the emitter-base junction of said transistor to maintain said transistor in a conductive state, means responsive to said fly-back pulses for applying positive electrical pulses to said collector coincident with said horizontal synchronizing components and of such amplitude as to cause pulses of collector current to flow through said transistor during the application of said electrical pulses, means responsive to said pulses of collector current for deriving a negative signal related to the average flow of collector current through said transistor, and means for utilizing said derived negative signal to control the gain of said variable gain amplifying means, whereby the amplitude of said composite picture signal is controlled.

9. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplified picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a transistor of the N-P-N type having an emitter, a base and a collector, means independent of said video amplifier connected to the detector load resistance means for applying a portion of the detected composite picture signal between said emitter and said base, means for forward biasing the emitter-base junction of said transistor to maintain said transistor in a conductive state, capacitance means, diode means series connected between said capacitance means and said collector, shunt resistance means connected in shunt of said capacitance means, means for applying positive electrical pulses to said collector coincident with said horizontal synchronizing components and of such amplitude as to cause pulses of collector current to flow unidirectionally through said transistor, said diode means and said capacitance means during the application of said electrical pulses, said diode means being polarized to pass said pulses of collector current, and means for utilizing the negative potential thereupon developed on said capacitance means to control the gain of said variable gain amplifying means, whereby the amplitude of said composite picture signal is controlled.

10. Automatic gain control for a television receiver including variable gain amplifying means for amplifying the signal received by the television receiver, a detector for demodulating the amplified signal to produce across detector load resistance means a detected composite picture signal having picture signal components and horizontal and vertical synchronizing components, video amplifier means coupled to said detector load resistance means for amplifying the picture signal components and applying the amplifier picture signal components to picture reproducing means, and horizontal and vertical deflection circuits responsive to the horizontal and vertical synchronizing components, respectively, for driving the horizontal and vertical deflection elements of the picture reproducing means in synchronism with said synchronizing components, said automatic gain control comprising a ponents and of such amplitude as to cause pulses of collector current to flow unidirectionally through said transistor, said diode means and said capacitance means during the application of said electrical pulses, said diode means being polarized to pass said pulses of collector current, the time constant of said capacitance means and said shunt resistance means being long relative to the period of said electrical pulses whereby a negative charge is developed on said second terminal related to the average collector current through said transistor, and means for utilizing the negative potential thereupon developed on said second terminal to control the gain of said variable gain amplifying means, whereby the amplitude of said composite picture signal is controlled.

References Cited

UNITED STATES PATENTS

| | | | |
|---|---|---|---|
| 2,906,817 | 9/1959 | Kidd et al. ---------- | 178—7.3 |
| 2,977,411 | 3/1961 | Goodrich ----------- | 178—7.3 |

ROBERT L. GRIFFIN, *Primary Examiner.*

ROBERT L. RICHARDSON, *Assistant Examiner.*

U.S. Cl. X.R.

325—409